Patented Dec. 25, 1928.

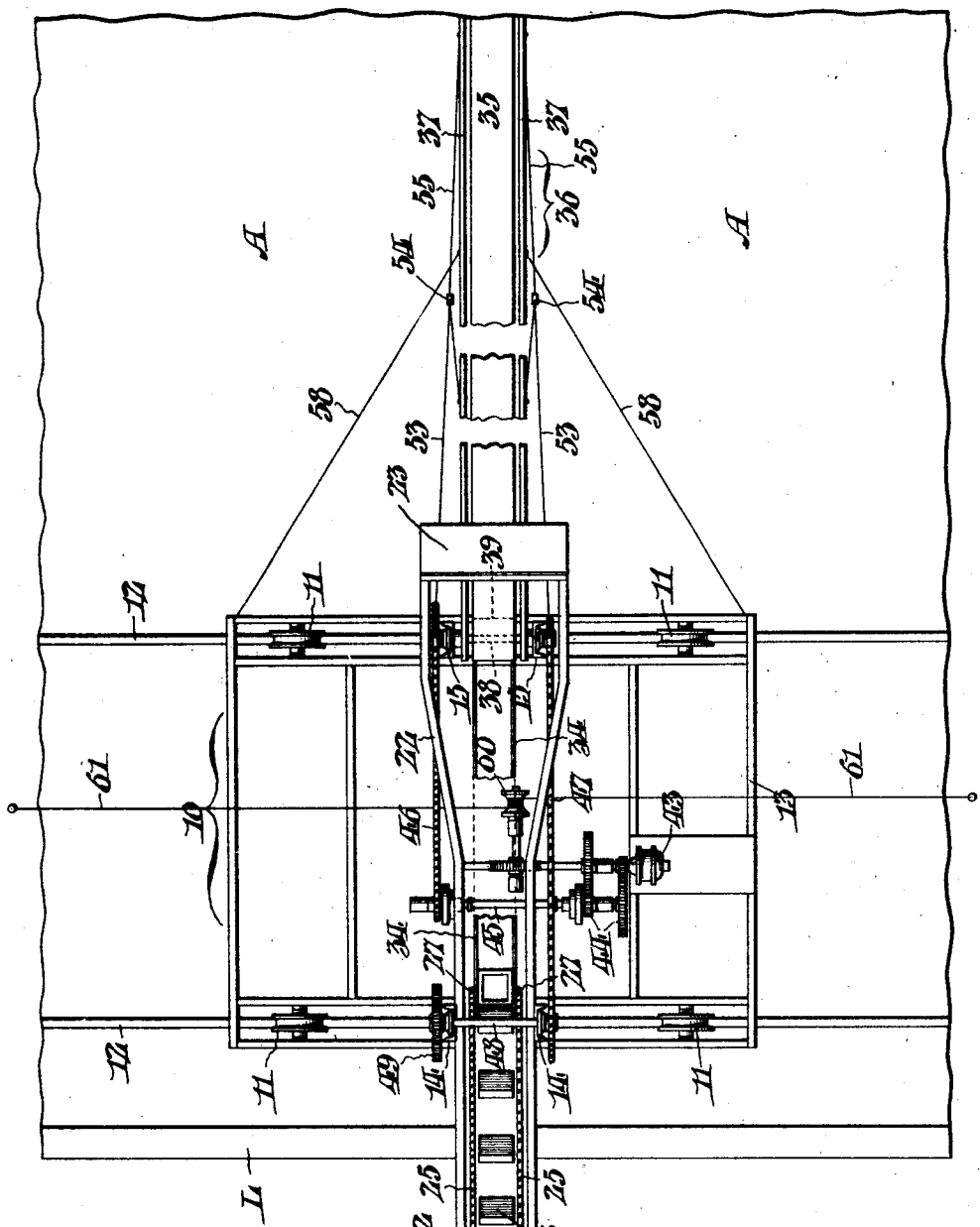

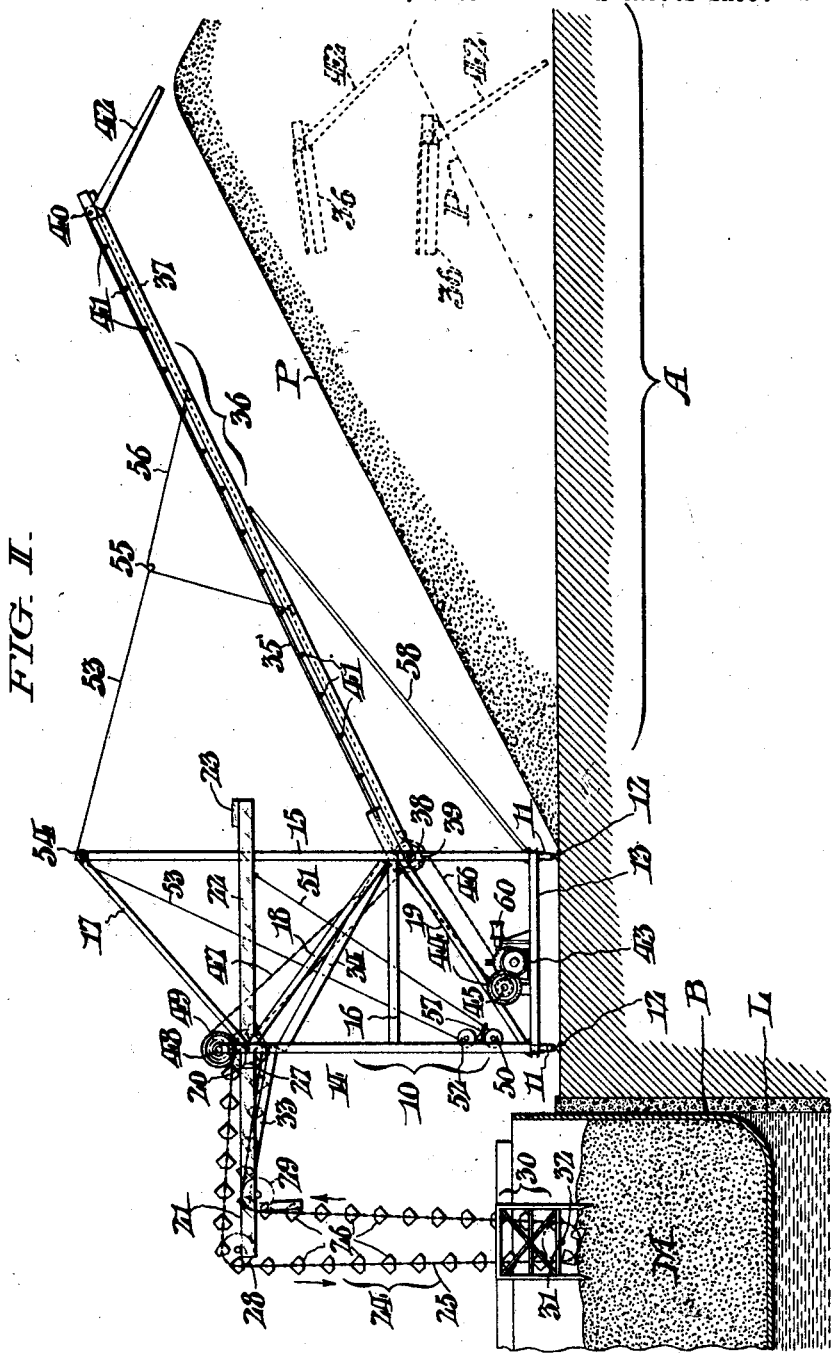

1,696,780

UNITED STATES PATENT OFFICE.

CHARLES G. PFEIFFER, OF PHILADELPHIA, PENNSYLVANIA, ASSIGNOR TO SPECIALTY ENGINEERING COMPANY, OF PHILADELPHIA, PENNSYLVANIA, A CORPORATION OF PENNSYLVANIA.

MATERIAL-HANDLING APPARATUS.

Application filed December 9, 1926. Serial No. 153,513.

This invention relates to apparatus for handling granular or lump materials such as sand, gravel, coal, etc.; and, more particularly to apparatus for unloading materials of the kind mentioned from conveyances and conducting them to places of storage, for example at railroad sidings, or at wharves and piers for ships and barges.

The main objects of my invention are to enable continuous and expeditious transport of the materials from the conveyances to the points or regions of disposal, and to provide apparatus whereby the foregoing may be accomplished to the end of obviating successive handlings of the materials as was generally necessary heretofore.

My invention is further directed toward securing the above advantages in an apparatus that is exceedingly compact in construction, portable, and capable of easy and quick manipulation in adapting it to various conditions of usage.

Other objects and attendant advantages of this invention will be readily apparent from the detailed description which follows of the typical embodiment delineated in the drawings. Fig. I is a plan view, more or less diagrammatically represented, showing the manner in which my invention is used at wharves for ships or barges; and, Fig. II is a side elevation of the complete organization, on a somewhat smaller scale than that of the preceding illustration.

With more detailed reference to the drawings, 10 designates, comprehensively, a supporting structure having the form of a carriage which is equipped with flanged wheels 11, running on rails 12 that extend along the dock walls or unloading place L for ships or barges B, in close proximity to the water's edge. Although herein depicted as constructed from conventional iron shapes, the carriage 10 may be built of timber if desired or found expedient in practice. As shown in Fig. I, it has a platform 13 which is rectangular in plan and wherefrom rise, centrally of the back and front, spaced channel uprights 14, 14 and 15, 15 respectively, the latter of these being considerably higher than the former, as will be apparent upon reference to Fig. II. At an elevation above the platform 13, the uprights 14—15 are connected by horizontal channels 16, and the superstructure thus formed, otherwise tied together at other regions for greater rigidity, by a number of diagonal struts 17, 18 and 19. Near the top, the uprights 14, 14 jointly afford bearing support for a shaft 20 which serves as a pivot for an out-board boom 21 that over-reaches the edge of the wharf L, as clearly shown in Fig. II. The out-board boom 21 comprises side rails 22, which, for the most part, are parallel, but inward of the pivot shaft 20 diverge so as to clear the rear uprights 15. Beyond these uprights, the boom 21 carries a weight 23 to partly balance the overhang portion of said boom, as well as an elevating conveyer 24 suspended from it. This conveyer 24 may be of any suitable type, in the present instance embodying a pair of endless sprocket chains 25 with buckets or scoops 26, supported between them at uniform intervals. The sprocket chains 25 are trained about driving wheels 27 fast on the pivot shaft 20, and guided for movement horizontally of the boom 21 through cooperation of idler sprocket wheels 28, 29 that are suitably journalled at the outer end of said boom. Supported in suspension from the boom 21 is a "boot" 30 whereof the frame is made from structural angles, as conventionally depicted in Fig. II, which provides bearing for a common shaft 31 to serve a pair of companion idler sprocket wheels 32 that rest in the drop loops formed in the suspended portion of the bucket conveyer 24. By virtue of the central pivoting of the out-board boom 21, it will be obvious that the conveyer 24 is permitted to recede downward gradually as the level of the material M in the barge B drops, incidental to unloading, the counterweight 23 operating in the meanwhile to maintain the chains 25 taut. In this way, the conveyer buckets 26 are always kept active at the level of the material M in the barge B, lateral displacement of the suspended portion of the conveyer 24 being prevented through penetration of the material by downward spike projections on the boot 30. With the conveyer 24 moving, as indicated by the arrows in Fig. II, it will be seen that the material M will be continuously elevated from the barge B; and, as said conveyer travels along the boom 21, an underlying trough or channel 33 assists in preventing spill of the contents of the buckets 26.

The material M so elevated is eventually released to drop onto an inclined chute 34 on the carriage 10, and thereby conducted to a belt delivery conveyer 35 on an in-board boom 36, which extends from the opposite side of said carriage and over-reaches an adjacent storage area A. The boom 36, like the out-board boom 21, has cross-connected side arms 37 that are fulcrumed on a pivot shaft 38 supported in bearings afforded jointly by the spaced uprights 15. The delivery conveyer 35 runs about end pulley wheels 39, 40 whereof the former 39 is fixed on the pivot shaft 38 and serves as the driver, while the latter 40 has journal support at the outer end of the boom 36. Intermediate the pulleys 39, 40 the belt conveyer 35 is sustained against sagging by idlers 41 suitably supported along the boom 36. The material M received by the belt conveyer 35 is delivered to a chute 42 at the end of the boom 36 for discharge onto the storage area A, and, in accumulating, gradually takes the form of a pile P, as shown in Fig. II.

To simultaneously actuate the elevating conveyer 24 and the "stocking out" belt conveyer 25 at properly synchronized surface speeds to insure uninterrupted transport of the material M by the apparatus, I preferably use a drive system which includes a motor 43 that is coordinated, through speed reduction gearing 44, with a counter shaft 45. The movement of this counter shaft 45 is transmitted, through a direct sprocket chain connection 46, to the drive shaft 38 for the delivery conveyer pulley 39, and relayed from thence by a sprocket chain connection 47, to a shaft 48 at the top of the uprights 14, the latter shaft being coordinated, in turn, with the drive shaft 20 of the elevating conveyer 24, through speed reduction gearing 49.

The means provided for manipulating the out-board boom 21, for the elevating conveyer 24, embodies a winch or drum 50 to take up—or let out on—a cable 51 whereof the end is hitched to one of the inner or weighted arms 22 of said boom. A similar winch or drum 52 is provided for manipulating the in-board boom 36 that serves the delivery conveyer 35, a pair of connection cables 53 being used in this instance, the same passing over pulleys 54 at the tops of the uprights 15 to tackle blocks 55 engaging suspension cables 56 which have their ends respectively secured at spaced points along the opposite side rails 37 of the boom 36. By preference, the winding winches 50, 52 are incorporated in a single control unit with suitable clutching means, not shown, permitting selectivity as between them and operation by a common crank handle 57. In order to stabilize and brace the in-board boom 36 against vibration and lateral displacement, I may use supplemental guy or stay cables 58 in connection with suitable means to tie them up to the proximate corners of the carriage platform 13.

The operation of my improved material handling apparatus is thought to be clear from the foregoing without necessity for further elaboration in this regard. Its use will obviously be attended by continuous and systematic unloading of the barge B and concurrent delivery of the material to the storage area A. As previously explained the elevating conveyer 24 will adapt itself to the receding level of the material M in the barge B without attention. It therefore remains only to occasionally lift the in-board boom 36 by means of the winch drum 52 provided for that purpose, as the storage pile P increases in size and height, from one elevation to another as variously indicated in dotted lines in Fig. I. Through this provision, the drop of the material M may be regulated to the end of avoiding breakage through the fall, a very important consideration in handling materials like coal. When required or desired, the apparatus may be moved by shifting of the carriage 10 to a new location on the track rails 12, when a new ground pile P is to be initiated further along the dock or wharf L; or, when subsequently received material M of a different kind, is to be deposited on another part of the storage area A. For the latter purposes, I have herein shown a winding winch 60 on the carriage platform 13, and a tow cable 61 of a conventional sort. The winch 60 may be operated in any convenient manner, for example by the motor 43 under control of a suitable clutch, not shown. If special requirements of practice should warrant it, the boom supporting structure may obviously be mounted on a swivel pivot, so that it may be swung horizontally as well as shifted from one point of operation to another.

It is of course to be understood that my invention is applicable in instances other than the one herein specifically described, and the appended claims are therefore to be construed broadly with the above thought in mind.

Having thus described my invention, I claim:

1. A material handling apparatus of the type described comprising a portable supporting structure with pairs of spaced verticals, one pair being considerably higher than the other, with intervening bracings, a counter-balanced out-board boom pivoted to the shorter verticals with the inner portion laterally expanded outwardly of the higher verticals, an elevating conveyer with a material penetrating boot supported by the counterbalanced boom, an in-board boom fulcrumed to the higher verticals with a delivery conveyer trained thereabout, the pivotal axes of the booms serving as the drivers for the respective conveyers, a chute intermediate said conveyers, a prime mover on the supporting structure, and drive connections from the prime mover to the pivotal axes aforesaid for actuating the conveyers at synchronized speed to thereby continuously transport the material handled.

2. A material handling apparatus of the type described comprising a portable supporting structure with parallel pairs of standard-section verticals, one pair of said verticals being considerably higher than the other, horizontal ties and diagonal struts rigidly bracing the verticals, a counter-balance out-board boom centrally pivoted adjacent the upper ends of the shorter verticals with the inner portion thereof expanded outwardly relative to the higher verticals, an elevating conveyer with a material penetrating boot supported by the counter-balanced boom, an in-board boom fulcrumed at a lower level to the higher verticals and aligning with the counter-balanced boom aforesaid, a belt delivery conveyer entrained about the in-board boom, the pivotal axes of both booms serving as the drivers for the respective conveyers, an inclined chute intervening between said conveyers, a prime mover on the supporting structure and driving connections from the prime mover to the pivotal axes aforesaid for progressing the conveyers at synchronized speed for continuous transport of the material being handled.

3. A material handling apparatus of the type described comprising a portable supporting structure with parallel pairs of standard-section verticals, one pair of said verticals being considerably higher than the other, horizontal ties and diagonal struts rigidly bracing the verticals, a counter-balanced out-board boom centrally pivoted adjacent the upper ends of the shorter verticals with the inner portion thereof expanded outwardly relative to the higher verticals, an elevating conveyer with a material penetrating boot supported by the counter-balanced boom, an in-board boom fulcrumed at a lower level to the higher verticals and aligning with the counter-balanced boom aforesaid, a belt delivery conveyer entrained about the in-board boom, the pivotal axes of both booms serving as the drivers for the respective conveyers, an inclined chute intervening between said conveyers, means whereby the in-board boom may be swung on its pivot to accommodate the rise of a storage pile and to prevent undue breakage of the discharging material, a prime mover on the supporting structure and driving connections from the prime mover to the pivotal axes aforesaid for driving the conveyers at synchronized speed for continuous transport of the material being handled.

4. A material handling apparatus of the type described comprising a portable supporting structure with parallel pairs of standard-section verticals, one pair of said verticals being considerably higher than the other, horizontal ties and diagonal struts rigidly bracing the verticals, a counter-balanced out-board boom centrally pivoted adjacent the upper ends of the shorter verticals with the inner portion thereof expanded outwardly relative to the higher verticals, an elevating conveyer with a material penetrating boot supported by the counter-balanced boom, an in-board boom fulcrumed at a lower level to the higher verticals and aligning with the counter-balanced boom aforesaid, a belt delivery conveyer entrained about the in-board boom, the pivotal axes of both booms serving as the drivers for the respective conveyers, an inclined chute intervening between said conveyers, a single control means whereby the respective booms may be selectively positioned to ensure continuous elevation of the material and its optional distribution with respect to a storage area, a prime mover on the supporting structure and driving connections from the prime mover to the pivotal axes aforesaid for driving the conveyers at synchronized speed for continuous transport of the material being handled.

In testimony whereof, I have hereunto signed my name at Philadelphia, Pennsylvania, this 3rd day of December, 1926.

CHARLES G. PFEIFFER.